United States Patent
Walz

(10) Patent No.: US 7,686,126 B2
(45) Date of Patent: Mar. 30, 2010

(54) ELECTRIC MOTOR ASSISTED STEERING APPARATUS

(75) Inventor: Stefan Walz, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 353 days.

(21) Appl. No.: 11/713,866

(22) Filed: Mar. 5, 2007

(65) Prior Publication Data
US 2007/0227805 A1   Oct. 4, 2007

(30) Foreign Application Priority Data
Mar. 7, 2006   (DE) ................. 10 2006 010 357

(51) Int. Cl.
*B62D 5/04* (2006.01)
(52) U.S. Cl. .................. 180/446; 180/443; 701/41
(58) Field of Classification Search ............ 180/446, 180/443, 444; 701/41
See application file for complete search history.

(56) References Cited

U.S. PATENT DOCUMENTS

| | | | |
|---|---|---|---|
| 4,660,671 A | 4/1987 | Behr et al. | |
| 5,086,859 A | 2/1992 | Takahashi et al. | |
| 5,257,828 A * | 11/1993 | Miller et al. | 180/446 |
| 6,144,137 A * | 11/2000 | Engelbert | 310/258 |
| 6,338,016 B1* | 1/2002 | Miller et al. | 701/43 |
| 6,711,510 B2* | 3/2004 | Van Reenen | 702/65 |
| 6,845,309 B2* | 1/2005 | Recker et al. | 701/41 |
| 7,163,080 B2* | 1/2007 | Fardoun et al. | 180/446 |
| 2002/0046898 A1* | 4/2002 | Bloch et al. | 180/446 |
| 2004/0148079 A1* | 7/2004 | Sugiyama et al. | 701/41 |
| 2006/0201736 A1* | 9/2006 | Fardoun et al. | 180/446 |

FOREIGN PATENT DOCUMENTS

EP   02 48 034   12/1987

\* cited by examiner

*Primary Examiner*—Kevin Hurley
*Assistant Examiner*—Tashiana Adams
(74) *Attorney, Agent, or Firm*—Jordan and Hamburg LLP

(57) ABSTRACT

An electromechanical steering device for a motor vehicle having at least one electric motor and power electronics for controlling the electric motor includes at least one temperature sensor for measuring the temperature of the power electronics and/or the ambient temperature of the power electronics and switching times of the power electronics are variable as a function of the measured temperature.

20 Claims, 3 Drawing Sheets

ELECTRIC MOTOR ASSISTED STEERING APPARATUS

BACKGROUND OF THE INVENTION

The invention relates to an electric motor-supported steering system.

The term electric motor-supported steering devices includes active steering systems in which an electric motor has a driving action on a differential drive in order to superimpose a steering movement on the steering movement initiated by the driver depending on the driving situation. Such a steering device is known for instance from DE 39 08 217 A1. Furthermore, the aforesaid preamble also includes steering devices in which the task for the electric motor is merely to support the steering movement initiated by the driver by making available auxiliary steering force. In such steering systems, the electric motor is frequently drivingly connected to a rack of a steering gear.

The electric motors, embodied for instance as synchronous or asynchronous motors, are controlled using power electronics with a frequency converter. It converts the supply voltage from the vehicle onboard electric system to a plurality of clocked pulse-width modulated signals with frequencies in the 20 kHz range. The mean of the pulse-modulated signals is set such that the motor current desired depending on application is set via the inductivity of the electric motor. Depending on application, the motor current can be for instance sinusoidal or rectangular. The power electronics contains a plurality of power transistors. The switching processes performed thereby necessarily result in the transmission of interfering signals that affect electromagnetic compatibility (EMC). These are conducted for instance via the lines to the electric motor, the battery line for the steering device, and other electric connections on the steering device and there cause interfering emissions. In addition to the direct interfering emissions, there is overcoupling onto other lines in the motor vehicle and this causes further interfering emissions and/or galvanic interfering transmission to the onboard electric system.

Minor EMC interference results from long switching times, that is, from long control voltage rise and/or fall times and/or from long control current rise and/or fall times for building up and reducing the capacities of the power electronics or power transistors, but the power loss in the power electronics during long switching times is great, which can lead to the power electronics heating up sharply and thus in extreme cases to a functional failure of the power electronics and thus of the electric motor. When dimensioning the control of the electric motor, the switching times are set or established as slow as is permissible for a theoretical maximum ambient temperature or maximum power electronics temperature. That is, the design is based on the maximum permissible power loss and thus the maximum permissible heating at a theoretical maximum temperature.

The underlying object of the invention is to improve the EMC in a steering device.

SUMMARY OF THE INVENTION

The invention is based on the knowledge that, statistically, the theoretical maximum temperature underlying the design of the control of the electric motor is attained only rarely. The maximum temperature occurs only in vehicles used in hot climates, only for a very short period in a year, only during the hottest part of the day, only when the load on the vehicle's internal combustion engine is also at its maximum and the vehicle speed is slow, in particular when ascending mountains, and only when extreme steering maneuvers are performed at the same time. As a rule, the actual temperature of the power electronics or the ambient temperature of the power electronics is below this maximum temperature value so that over long operating periods even longer switching times could be attained, with resultant low EMC interference. Thus, most of the time high EMC interference is handled in a manner that is not noticed. In accordance with the invention, it is provided that the switching times for the power electronics are adapted to the actual temperature of the power electronics, or its ambient temperature, as measured by means of at least one sensor, in particular such that the switching times are maximized in order to cause the least EMC interference possible. In the framework of the invention, only the turn-on times or only the turn-off times or both together are varied.

Due to the invention, the EMC filter devices can be reduced and/or EMC emissions can be improved.

In accordance with the invention, the switching times for a power transistor in the power electronics can be changed by varying the control voltage rise speed and/or control current rise speed on the power transistors for building up or reducing the capacities of the power transistors. In particular a capacity must be built up between the gate terminal and the source terminal of a power transistor, preferably a MOSFET, so that the transistor conducts between source terminal and drain terminal. The drain or source terminal for the power transistor is connected to a coil of the electric motor. The time for building up or reducing this capacity is largely equal to the switching time of the power transistor.

In the simplest case, it is possible to select between at least two different switching times that can be provided for instance by selecting one of two activation lines in a power transistor that have different size ohmic resistances. If a pre-specified temperature is exceeded, the activation line with the smaller resistance with the resultant faster switching time is selected. If the temperature drops below the pre-specified level, the alternative activation line is used. In addition, it is conceivable that if the temperature drops below an even lower pre-specified power electronics temperature, the connecting lines will be used together for supplying the power transistor with control voltage and/or control current.

A more finely graduated or continuous adaptation of the switching times to the temperature of the power electronics or to the environment of the power electronics can be provided in that a power transistor driver unit is provided for furnishing the control currents and control voltages for the power transistors of the power electronics (power output stage). For varying the switching times of the power electronics components it is now provided that the power transistor driver unit includes at least one variable, i.e. adjustable, current source for varying the turn-on time of a power transistor for the power electronics. If the variable current source is connected by means of a switch, a control current flows to the power transistor. A more rapid or slower switching process for the power transistor results depending on the current value selected. The control current rise speed and/or control voltage rise speed can be changed by means of the variable programmable current source. Preferably the power transistor driver unit contains a charging pump in order always to make available to the variable current source a constant input voltage, preferably 10 V, since the onboard electric system voltage is subjected to great fluctuations.

A logic unit is provided for controlling the variable current source as a function of the temperature measured by means of a sensor, and it is connected to the temperature sensor. The logic unit provides the control current rise speed or control voltage rise speed. The power transistor driver unit can be connected to the logic unit via a digital or analog interface. If a digital interface is used, serial data signals flow, whereby different current rise rates can be associated with the transmitted data signals. If it is an analog connection, the transmitted voltages or currents can be used directly as the control voltage for the adjustable current source.

In addition to or alternative to at least one adjustable current source for changing the rise times for the control voltage and/or control current for the turn-on process for a power transistor, at least one additional, separately adjustable current source can be provided in order to vary the turn-off time for the power transistor. It is also conceivable to provide a single common adjustable current source that can be used to commonly vary the turn-on and turn-off times of the transistor.

Additional advantages and useful further embodiments of the invention are explained in the claims, description of the figures, and drawings.

DESCRIPTION OF THE PREFERRED EMBODIMENTS

Identical components and components with the same function are identified with the same reference numbers in the figures.

Figure 1:
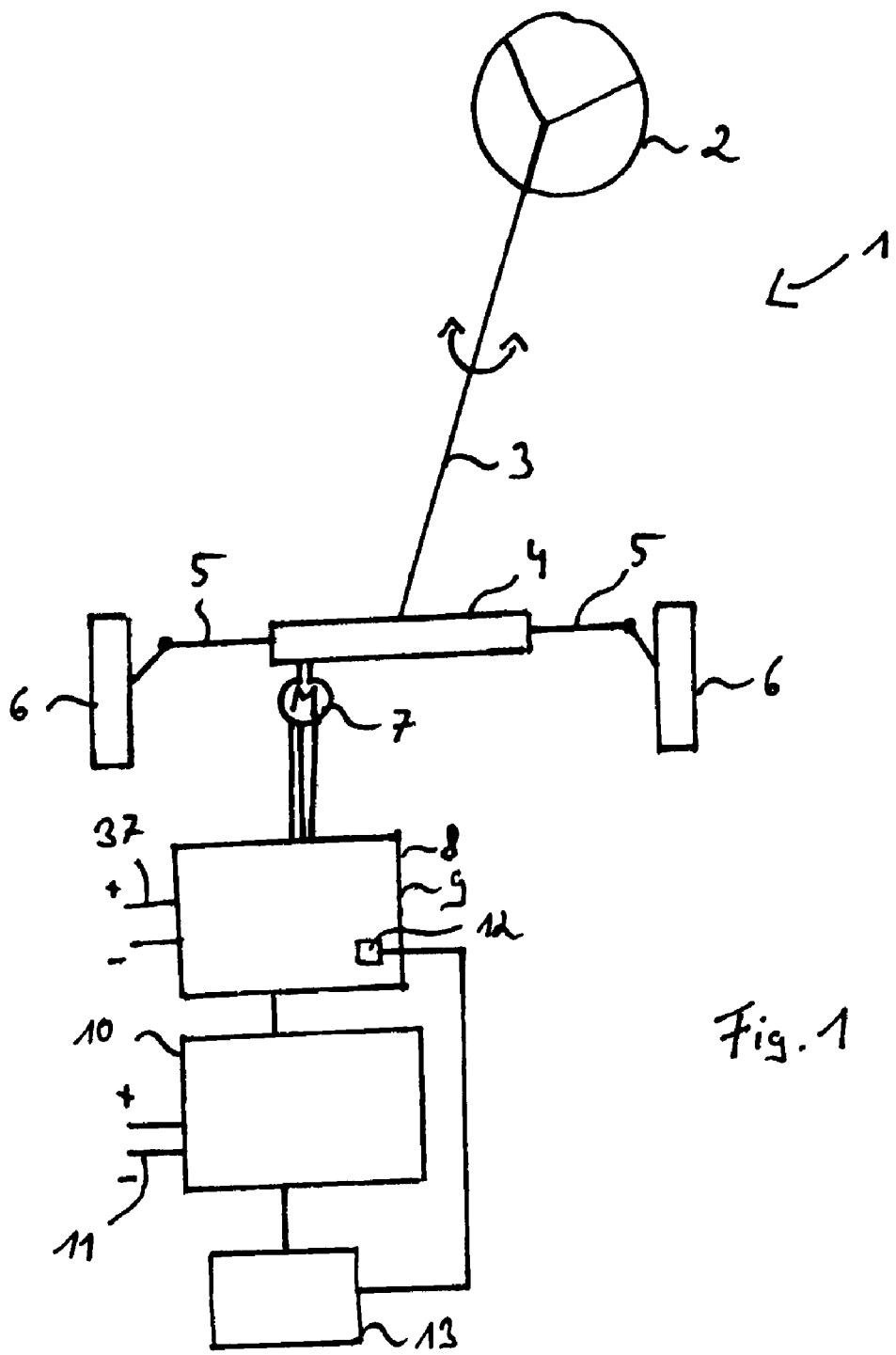
FIG. 1 is a schematic depiction of a steering device with electric motor and control device.

FIG. 1 is a schematic depiction of an electromechanical steering system 1 with steering means 2 embodied as a steering wheel. The steering means 2 is connected via a drag link 3 to a steering gear 4 that converts the rotary movement of the steering means 2 to a translatory movement that is transmitted via a linkage 5 to front vehicle wheels 6 for changing the vehicle wheel angle of lock. An electric servomotor 7 acts on the steering gear 4 for supporting the steering movement of the driver. During active steering, in addition or alternative to the electric motor 7, another electric motor that acts on a superimposing gear in the steering column can be provided that can be activated in accordance with the invention.

For controlling the electric motor 7, a frequency converter 9 with a plurality of power transistors (not shown in FIG. 1, see FIGS. 2 and 3) is provided as power electronics 8. The transistors contain their control voltage or their control current for building up and reducing the capacities of a power transistor driver unit 10 with a plurality of adjustable current sources (not shown in FIG. 1, see FIG. 2). The power transistor driver unit 10 is connected with connecting lines 11 to the onboard electric system of the motor vehicle. Likewise, the frequency converter 9 is connected to the onboard electric system with connecting lines 37 for connecting the voltage or current to be modulated. The power transistor driver unit 10 is connected to a logic unit 13 that regulates or controls the current sources as a function of the temperature of the power electronics 8 measured by means of a sensor 12 or the ambient temperature of the power electronics 8. The switching times of the semi-conductor components in the power electronics are influenced using the change in the control current rise speed and/or control voltage rise speed, depending on the temperature measured. The slower the rise time, the greater the power loss and thus the heat radiation and the lower the transmission of interfering signals. In accordance with the invention, the switching times can be slowed as much as is permissible at the current temperature, possibly less a safety temperature range, which results in a higher power loss but weaker interfering signals.

The temperature sensor 12, together with the power transistor driver unit 10 and the logic unit 13, can be arranged on a plate that together with the power electronics 8 is arranged on a metal block for removing heat. Likewise, it is possible to embody the temperature sensor 12 as an immediate component of the power transistor driver unit 10. The measured temperature is then the ambient temperature of the power electronics 8, which is largely equal to the actual temperature of the power electronics 8 or is at least proportional thereto.

Figure 2:
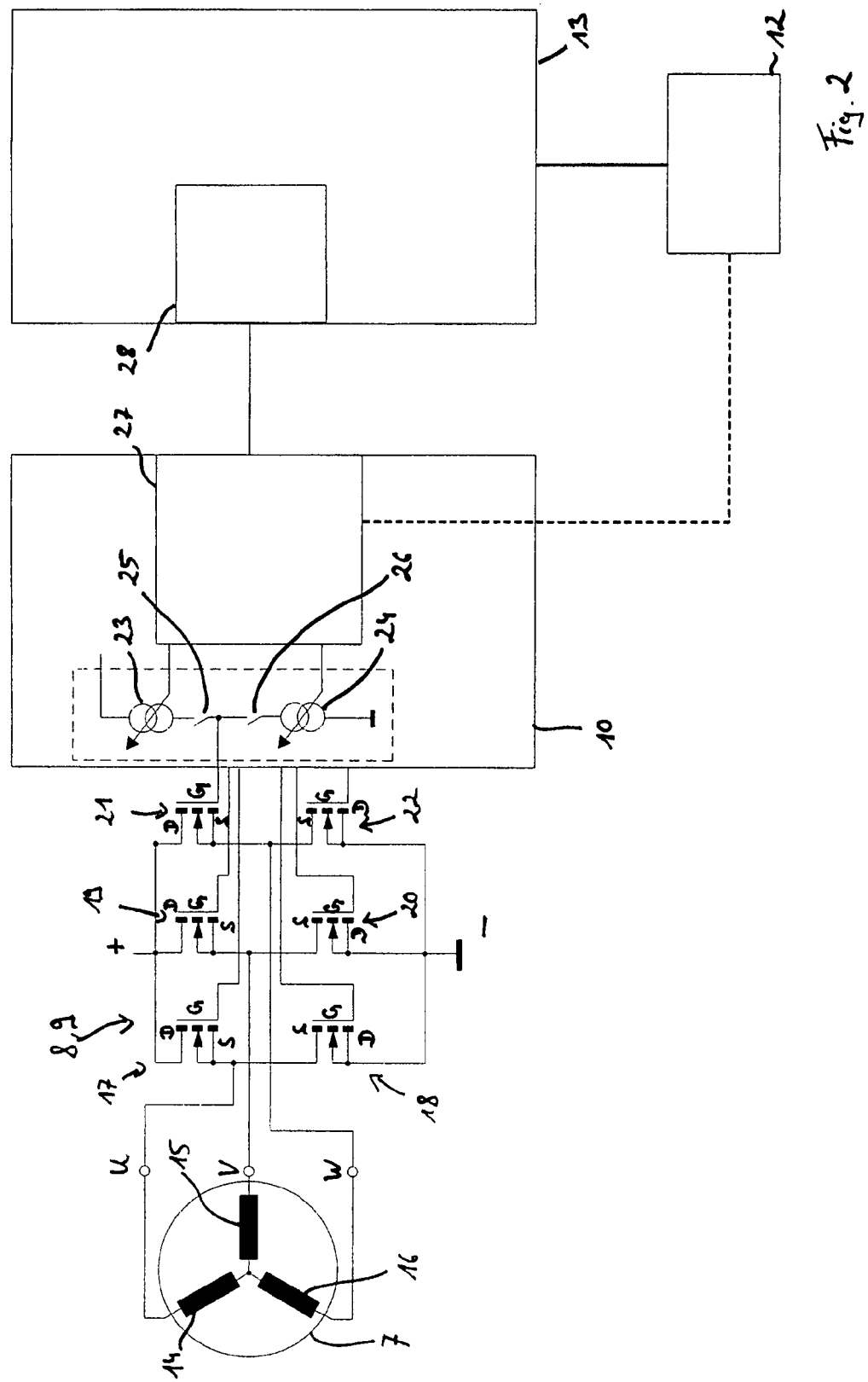
FIG. 2 is a schematic depiction of an electric motor for a steering device with control devices.

FIG. 2 depicts an electric motor 7 that acts for instance directly drivingly on a steering gear for a steering device or on a superimposing gear (active steering).

The three-phase system of the depicted electric motor 7 has three coils 14, 15, 16 offset in the circumferential direction that are supplied electrical energy by three phases U, V, W that are switched as a star circuit. The phases U, V, W are connected to power electronics embodied as a frequency converter 9. The frequency converter 8 includes six power transistors 17 through 22, so-called MOSFETs (metal oxide semiconductor/silicon field effect transistors), two power transistors 17, 18; 19, 20; 21, 22 arranged in the drawing one above the other being allocated to each phase U, V, W. The power transistors in the power transistor pair are inversely clocked and supply the coils 14, 15, 16 with pulse-width-modulated voltage or current. A dead time is maintained between the switching of the power transistors of a power transistor pair in order to prevent simultaneous turn-on. The frequency converter 8 or [sic] is supplied with onboard electric system voltage that is switched or modulated by the power transistors 17 through 22.

The power transistors are connected with their gate terminals G and source terminals S to a power electronics driver unit 10. In this exemplary embodiment, the latter has two variable, displaceable current sources 23, 24 for each power transistor 17 through 22, whereby for reasons of clarity only current sources 23, 24 for controlling power transistor 21 are illustrated. The current source 23 at the top in the drawing varies the control current rise speed or control voltage rise speed for the turn-on process of the transistor 21, while the lower current source 24 varies the control current or control voltage rise speed for the turn-off process of the transistor 21. The current sources 23, 24 can be turned on/off via switches 25, 26.

For controlling the current sources 23, 24 as a function of the temperature of the power electronics 8, a logic unit is provided 13 that communicates with the power electronics driver unit 10, in the depicted exemplary embodiment via digital interfaces 27, 28 (e.g. SPI, I²C). Likewise, it is conceivable to use analog interfaces (pulse width modulation, voltage). The logic unit 13 is connected to the temperature sensor 12 that measures the temperature of the power electronics or its ambient temperature. The current sources 23, 24 are controlled depending on the measured temperature, which changes the switching times for the power transistors 17 through 22, in this case the power transistor 21.

Figure 3:
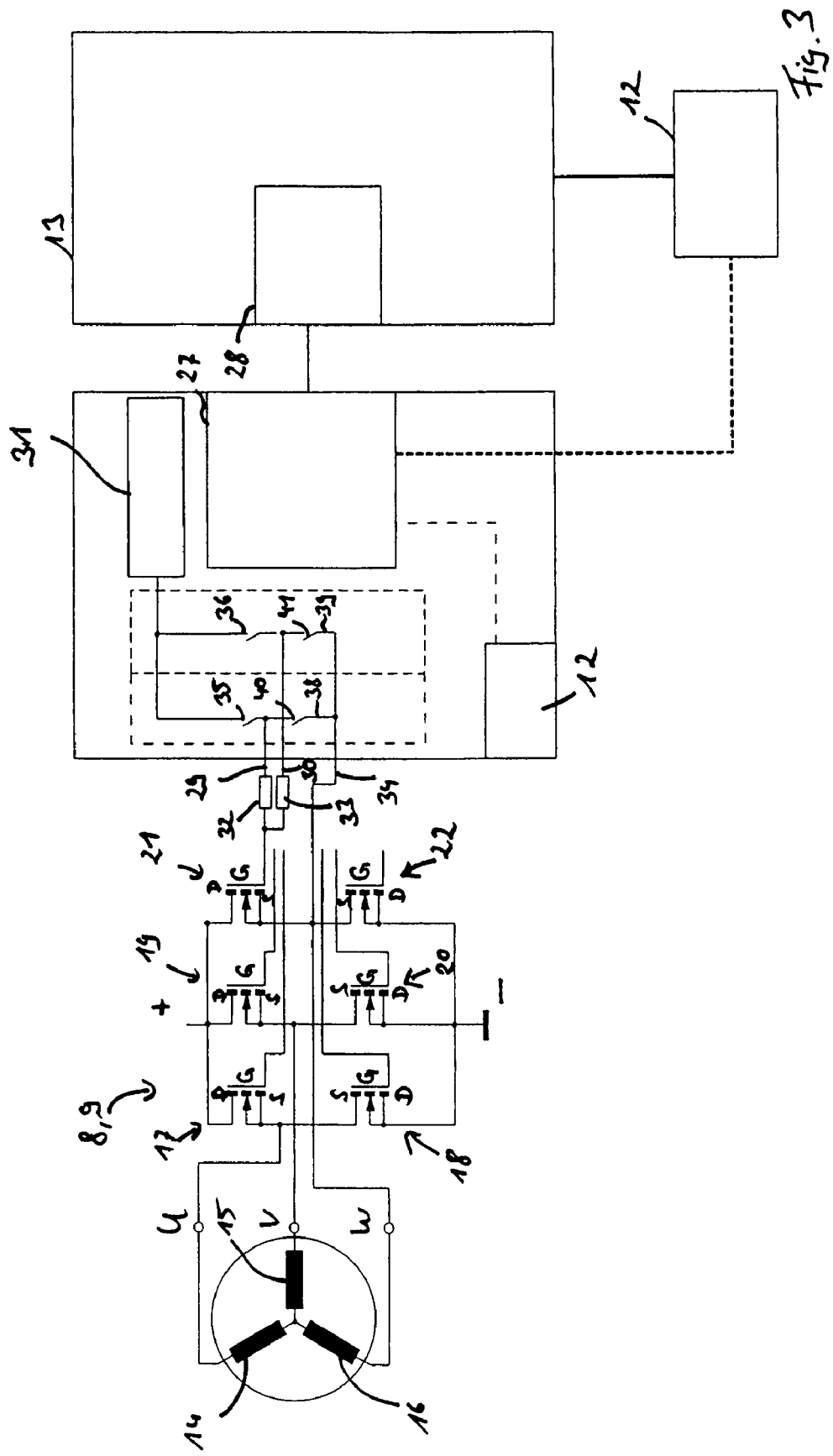
FIG. 3 is a schematic depiction of an alternative control device.

FIG. 3 depicts a simpler embodiment of the invention. Using this embodiment it is only possible to switch between three different switching times, but this by itself contributes to a clear improvement in the EMC. For reasons of clarity only the control of one power transistor 21 is depicted. The arrangement of the electric motor 7 and frequency converter 9 is the same as in the exemplary embodiment in accordance with FIG. 2. The gate terminal G of the power transistor 21 is connected to two activation lines 29, 30 that are switched in parallel and that have a common connection to a constant current source 31 with a nominal voltage of 10V. Furthermore the source terminal S of the power transistor 21 is connected to the constant current source 31 via a control line 34. Arranged in each activation line 29, 30 is an ohmic resistance 32, 33, whereby the two resistances 32, 33 are different in size. Each activation line 29, 30 can be turned on and off using a switch 35, 36. For activating the switches 35, 36, they are connected to a logic unit 13 that itself is connected to a temperature sensor 12 for measuring the temperature of the power electronics 8. As shown, the temperature sensor can for instance be embodied outside of the electronic components (to the right in the drawing) or additionally or alternatively for instance can be embodied as part of the power transistor driver unit 10 (center of the drawing). The switches 35, 36 are actuated as a function of the temperature range of the measured temperature. Thus the activation lines can be used alternatively or cumulatively. Due to the resulting different size fall in the voltage based on the different resistances, there is an effect on the control current or control voltage of the power transistor 21, so that there can be variation between three different switching times. It is conceivable to provide additional activation lines and thus finer graduation in the switching times.

In order to effect a turn-off process in the power transistor 21, each activation line 29, 30 is connected via a connecting line 38, 39, each of which has a switch 40, 41, to the control line 34. By closing the switches 40, 41, the capacitor formed between gate terminal G and source terminal S is discharged, which causes the power transistor 21 to turn off the flow of current between gate terminal G and drain terminal D.

LEGENDS

1 Steering device
2 Steering means
3 Drag link
4 Steering gear
5 Linkage
6 Vehicle wheels
7 Electric motor
8 Power electronics
9 Frequency converter
10 Power electronics driver unit
11 Connecting lines
12 Temperature sensor
13 Logic unit
14 Coil
15 Coil
16 Coil
17 Power transistor
18 Power transistor
19 Power transistor
20 Power transistor
21 Power transistor
22 Power transistor
23 Variable current source
24 Variable current source
25 Switch
26 Switch
27 Interface
28 Interface
29 Activation line
30 Activation line
31 Constant current source
32 Resistance
33 Resistance
34 Control line
35 Switch
36 Switch
37 Connecting line
38 Connecting line
39 Connecting line
40 Switch
41 Switch

The invention claimed is:

1. An electromechanical steering device for a motor vehicle, comprising:
at least one electric motor, power electronics for controlling said electric motor and at least one temperature sensor for measuring the temperature of said power electronics and/or the ambient temperature of said power electronics, said power electronics having switching times which are variable as a function of the measured temperature, wherein:
said power electronics includes a frequency converter for pulse width modulation and has at least one power transistor, and
control voltage rise speed and/or control current rise speed on said power transistor can be varied for building up the capacities of said power transistor for varying the switching time of said power transistor.

2. An electromechanical steering device for a motor vehicle, comprising:
at least one electric motor, power electronics for controlling said electric motor and at least one temperature sensor for measuring the temperature of said power electronics and/or the ambient temperature of said power electronics, said power electronics having switching times which are variable as a function of the measured temperature, wherein:
said power electronics includes a frequency converter for pulse width modulation and has at least one power transistor,
control voltage rise speed and/or control current rise speed on said power transistor can be varied for building up the capacities of said power transistor for varying the switching time of said power transistor, and
a gate terminal and/or a source terminal of said power transistor is connected via at least two electric activation lines with different electrical resistances to a current source, and arranged in at least one activation line is at least one switch, the different activation lines being operable to be turned on and/or off alternatively and/or cumulatively as a function of the measured temperature for supplying said power transistor with control voltage and/or control current.

3. The electromechanical steering device in accordance with claim 2, comprising at least one logic unit for activating the switch of the activation lines as a function of the measured temperature.

4. The electromechanical steering device in accordance with claim 1, comprising at least one power transistor driver unit which includes at least one variable current source for varying the control voltage rise speed and/or the control current rise speed on said power transistor so as to vary a turn-on time and/or turn-off time of said power transistor.

5. The electromechanical steering device in accordance with claim 4, wherein said power transistor driver unit includes at least one additional variable current source for varying the control voltage rise speed and/or the control current rise speed on said power transistor so as to vary the turn-off time and/or turn-on time of at least said power transistor.

6. The electromechanical steering device in accordance with claim 4, wherein said power transistor driver unit is connected to at least one logic unit that controls said variable current sources as a function of the measured temperature.

7. The electromechanical steering device in accordance with claim 6, wherein said power transistor driver unit and said logic unit are connected to one another via digital interfaces.

8. The electromechanical steering device in accordance with claim 6, wherein said power transistor driver unit and said logic unit are connected to one another via analog interfaces.

9. The electromechanical steering device in accordance with claim 1, wherein said power electronics are controlled such that the control voltage rise speed and/or the control current rise speed on said power transistor are varied such that the switching times become shorter as temperature increases.

10. The electromechanical steering device in accordance with claim 1, wherein said at least one power transistor comprises a field effect transistor.

11. The electromechanical steering device in accordance with claim 1, wherein said at least one power transistor comprises a MOSFET.

12. The electromechanical steering device in accordance with claim 2, wherein said current source is a constant current source.

13. The electromechanical steering device in accordance with claim 6, wherein said at least one logic unit comprises a microcontroller.

14. An electromechanical steering device for a motor vehicle comprising:
   at least one electric motor;
   power electronics having power transistors for controlling said electric motor, said power transistors being controlled by control signals in the form of pulses;
   at least one temperature sensor for measuring temperature of one of said power electronics or an ambient temperature of said power electronics; and
   said power electronics being configured to control the control signals, as a function of the measured temperature, to vary a switching time period of said power transistors which is at least one of a switching-on time period or a switching-off time period of the power transistors, wherein the switching-on time period is a period required to transition said power transistors from an off state to an on state and the switching-off time period is a period required to transition said power transistors from an on-state to an off-state, and said switching time period is shortened when said measured temperature increases, wherein one of: a control voltage rise speed or a control voltage fall speed is varied to effect the control of the at least one of a switching-on time period or a switching-off time period of the power transistors; or a control current rise speed or a control current fall speed is varied to effect the control of the at least one of a switching-on time period or a switching-off time period of the power transistors.

15. The electromechanical steering device in accordance with claim 14, wherein one of a control voltage rise speed or a control voltage fall speed is varied to effect the control of the at least one of a switching-on time period or a switching-off time period of the power transistors.

16. The electromechanical steering device in accordance with claim 14, wherein one of a control current rise speed or a control current fall speed is varied to effect the control of the at least one of a switching-on time period or a switching-off time period of the power transistors.

17. The electromechanical steering device in accordance with claim 14, wherein said power electronics includes a frequency converter for pulse width modulation control of said power transistors.

18. The electromechanical steering device in accordance with claim 14, wherein:
   said power transistors each have:
      a control terminal connected to at least two electric activation lines having electrical resistances situated therein, and
      at least one of the two activation lines including a switch controlled as a function of the measured temperature; and
   said power electronics include a logic unit controlling the switching period of said power transistors by controlling said switches in the activation lines.

19. The electromechanical steering device in accordance with claim 14, wherein said power electronics includes variable current sources for varying at least one of a rise time or a fall time of the pulses of the control signals controlling the power transistors.

20. The electromechanical steering device in accordance with claim 14, wherein said power transistors are field effect transistors.

* * * * *